(12) United States Patent
Cory et al.

(10) Patent No.: US 8,303,379 B2
(45) Date of Patent: Nov. 6, 2012

(54) SYSTEMS FOR PROFILING SHEET PRODUCTS

(75) Inventors: Dean Cory, Wales (GB); David Jones, Wales (GB)

(73) Assignee: Titanium Metals Corporation, Dallas, TX (US)

( * ) Notice: Subject to any disclaimer, the term of this patent is extended or adjusted under 35 U.S.C. 154(b) by 198 days.

(21) Appl. No.: 12/713,449

(22) Filed: Feb. 26, 2010

(65) Prior Publication Data

US 2010/0221569 A1 Sep. 2, 2010

Related U.S. Application Data

(60) Provisional application No. 61/156,350, filed on Feb. 27, 2009.

(51) Int. Cl.
 *B24B 7/02* (2006.01)
(52) U.S. Cl. ........ 451/241; 72/379.6; 451/282; 451/388
(58) Field of Classification Search ................ 72/379.2, 72/379.6; 451/177, 178, 212, 213, 214, 215, 451/282, 388, 241
See application file for complete search history.

(56) References Cited

U.S. PATENT DOCUMENTS

| | | | | |
|---|---|---|---|---|
| 873,340 | A | * 12/1907 | Bagnall | 451/388 |
| 2,964,089 | A | * 12/1960 | Kunz | 72/106 |
| 3,693,301 | A | * 9/1972 | Lemaitre | 451/55 |
| 3,837,124 | A | * 9/1974 | Johnson et al. | 451/41 |
| 3,881,373 | A | 5/1975 | Nakamura et al. | |
| 3,889,431 | A | * 6/1975 | Johnson | 451/42 |
| 3,932,148 | A | 1/1976 | Krewalk | |
| 4,474,095 | A | 10/1984 | Heck | |
| 4,671,145 | A | * 6/1987 | Fehrenbach et al. | 82/1.11 |
| 5,993,143 | A | 11/1999 | Eltze et al. | |
| 6,536,250 | B1 | 3/2003 | Borchert | |

FOREIGN PATENT DOCUMENTS

| | | |
|---|---|---|
| EP | 0 381 999 A2 | 8/1990 |
| FR | 2 755 886 A1 | 5/1998 |
| GB | 952 358 | 3/1964 |
| JP | 62-128780 | 11/1988 |
| JP | 2006-068882 A | 3/2006 |

OTHER PUBLICATIONS

Courtman, R.A., et al., "Manufacturing Techniques on the Awa Argosy Aircraft", a paper presented to the Coventry Section of The Institute of Production Engineers, pp. 548-560, Dec. 2, 1958.

(Continued)

*Primary Examiner* — Timothy V Eley
(74) *Attorney, Agent, or Firm* — Locke Lord LLP

(57) ABSTRACT

Techniques for manufacturing sheet product of varying surface profile and products thus manufactured are disclosed herein. In some embodiments, the disclosed invention provides a method for profiling a surface of a sheet product having a first profile on first surface. In one embodiment, the method includes creating a profiling template or contoured support surface. A profiled surface may be formed by arranging the profiling template and the sheet product such that the profiling template is located between the sheet product and a support surface, conforming the arrangement of the sheet product and the profiling template to the support surface such that conformance causes the sheet product to have a second surface profile on the first surface, and processing the sheet product to form a third surface profile on the first surface.

10 Claims, 9 Drawing Sheets

OTHER PUBLICATIONS

International Search Report which was mailed May 6, 2010, and received in corresponding international patent application No. PCT/US2010/025537.

Written Opinion of the International Searching Authority which was mailed on May 6, 2010, and received for corresponding international patent application No. PCT/US2010/025537.

* cited by examiner

SYSTEMS FOR PROFILING SHEET PRODUCTS

CROSS-REFERENCE TO RELATED APPLICATIONS

This application claims priority under 35 U.S.C. §119(e) to U.S. Provisional Patent Application No. 61/156,350 which was filed on Feb. 27, 2009, the entirety of which is incorporated by reference as if fully set forth in this specification.

BACKGROUND OF THE INVENTION

I. Technical Field

The present invention relates generally to systems and methods for profiling a surface of a sheet product such as a sheet of metal or a metallic alloy.

II. Background of the Related Art

Thin gauge sheet product having tight tolerance (such as, for example, ±0.05 mm) can be manufactured by grinding and polishing the sheet product using a belt-grinding machine. The belt-grinding machine generally includes an abrasive grinding head and a vacuum bed which holds the sheet product flat in position and acts as a datum face to a grinding head. The grinding head itself is typically comprised of a fixed cylinder, around which a grinding belt passes. The vacuum bed, alternatively known as a vacuum chuck, generally has an o-ring groove machined into it such that a vacuum may be applied to hold the sheet product in position on the vacuum bed during grinding.

A conventional process to grind and polish flat thin gauge sheet product includes placing the sheet on the vacuum bed, holding the sheet product flat in position by applying a vacuum followed by passing the vacuum bed under a fixed grinding head numerous times. After each pass, the bed is raised to decrease the gap between the vacuum bed and the grinding head, thus grinding off and thinning the sheet product uniformly across the entire width of the sheet product.

Alternatively, the process to grind and polish tapered thin gauge sheet product can include passing the bed under the grinding head while gradually raising or lowering the bed between two set positions during each pass to gradually change the thickness of the sheet product between the set positions. This technique creates a tapered change in thickness which is uniform across the entire width of the sheet product.

In either of the above cases, the resultant sheet product is of substantially uniform thickness across the full width (i.e., the direction perpendicular to the grinding direction) of the sheet product, with a given surface roughness which itself depends on the grade of abrasive belt utilized and the number of passes performed.

A sheet product with uniform thickness across the full width of the sheet can, in some instances, have an impact on its performance. For example, where increased rigidity or additional material is required in certain regions, an as-formed sheet product must have the additional thickness across its full width. This additional material increases the final component weight and can potentially hinder performance. Both of these results can create additional costs which is undesirable to users of sheet product.

Accordingly, there exists a need in the art for a cost effective technique for producing a sheet product of controlled, variable thickness, which is both sufficiently controllable and repeatable to be utilized as a commercial manufacturing process.

SUMMARY OF THE INVENTION

In view of the above-describe problems, needs, and goals, the present invention provides techniques for manufacturing sheet product of varying surface profile and products thus manufactured.

In one embodiment, a method for profiling a surface of a sheet product having a first profile on first surface is provided. The method includes creating a profiling template, arranging the profiling template and the sheet product such that the profiling template is located between the sheet product and a support surface, conforming the arrangement of the sheet product and the profiling template to the support surface such that the conformance causes the sheet product to have a second surface profile on the first surface, and processing the sheet product to form a third surface profile on the first surface.

In another embodiment, the sheet product can be released from conformance with the profiling template such that the sheet product has a fourth surface profile on the first surface. The support surface can be a vacuum bed, and conforming the sheet product to the profiling template can further include applying a vacuum force to the arrangement of the profiling template and the sheet product. In still another embodiment the first surface may be processed by repeated passes of a grinding head. The separation between the grinding head and the arrangement of the profiling template and sheet product may also be reduced between passes of the grinding head.

In another embodiment, the present invention provides a system for profiling a surface of a sheet product. The system includes (1) a profiling template for creating a surface profile of the sheet product, (2) a support surface for holding the sheet product and the profiling template during processing, and (3) a processing head to process a first surface of the sheet product.

In some embodiments, the support surface can be a vacuum bed. In some embodiments the processing head and the support surface can be movable in one or more directions. In a preferred embodiment the processing head is a grinding head and the sheet product comprises a metal or alloy.

In yet another embodiment, the present invention provides a sheet product having a profiled surface. The surface is profiled by a method which includes creating a profiling template, arranging the profiling template and the sheet product such that the profiling template is located between the sheet product and a support surface, conforming the arrangement of the sheet product and the profiling template to the support surface, where the conformance causes the sheet product to have a second surface profile on a first surface, and processing the sheet product to form a third surface profile on the first surface.

In still another embodiment, techniques for profiling a surface of a sheet product including creating a profiling support surface, arranging the sheet product on the support surface, conforming the sheet product to the support surface, where the conformance causes the sheet product to have a second surface profile on the first surface, and processing the sheet product to form a third surface profile on the first surface. Systems for carrying out the exemplary method and products manufactured using the method are also disclosed.

The accompanying drawings, which are incorporated and constitute part of this disclosure, illustrate exemplary embodiments of the disclosed invention and serve to explain the principles of the disclosed invention.

Figure 1:
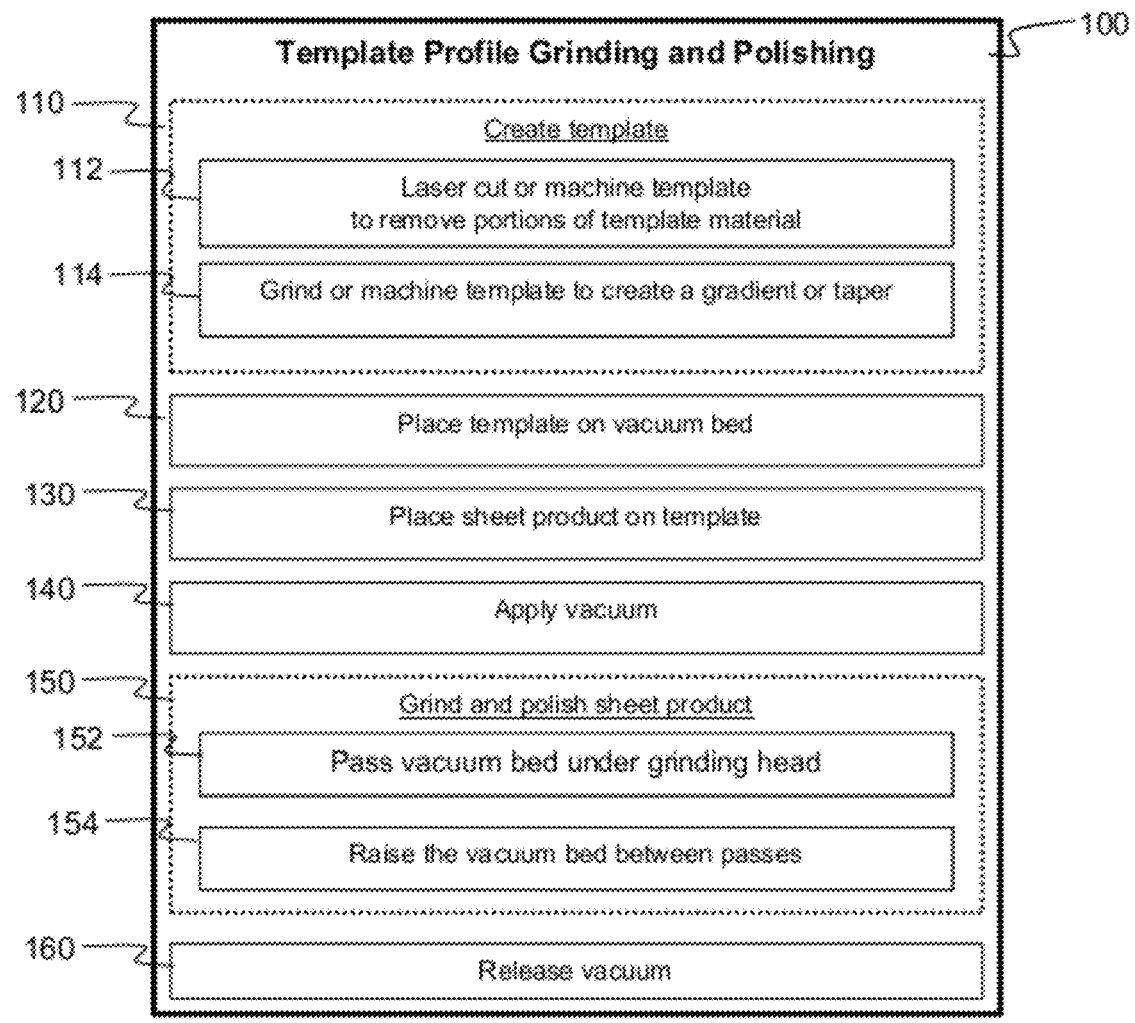
FIG. 1 is a flowchart illustrating a method in accordance with an exemplary embodiment of the present invention.

Throughout the drawings, the same reference numerals and characters, unless otherwise stated, are used to denote like features, elements, components or portions of the illustrated embodiments. Moreover, while the disclosed invention will now be described in detail with reference to the figures, it is done so in connection with the illustrative embodiments.

DETAILED DESCRIPTION OF THE INVENTION

The present invention provides techniques for the manufacture of sheet product having a varying surface profile that reduces or prevents increase of the overall weight of the sheet product and is well suited for any application where varying surface profile may be required of the final product and where repeatability of tight tolerances is desired. Thus, the disclosed techniques enable the resulting sheet product to have varying surface profile changes both along the length and across the width of the sheet. Such changes can be varied in terms of starting and ending points of the surface profile changes, and can occur along curved or straight lines.

FIG. 1 illustrates an exemplary method 100 for the manufacture of sheet product of varying surface profile in accordance with the disclosed invention. As shown in FIG. 1, the process begins in step 110 with the creation of a profiling template. The profiling template can be formed of any suitable material, for example steel or aluminum.

The profiling template should be sized such that it fits securely onto a suitable support surface, thus forming an air tight seal between the profiling template and the support surface, for example sized such that it fits inside an o-ring groove. In one embodiment, the profiling template can be ground or machined as in step 114 to create a gradient or taper along any portion of the template. In the same or another embodiment, the template can be laser cut or machined in step 112 to remove any number of portions of the template in any size or shape. As an example circles with 50 mm diameters may be formed.

Figure 2A:
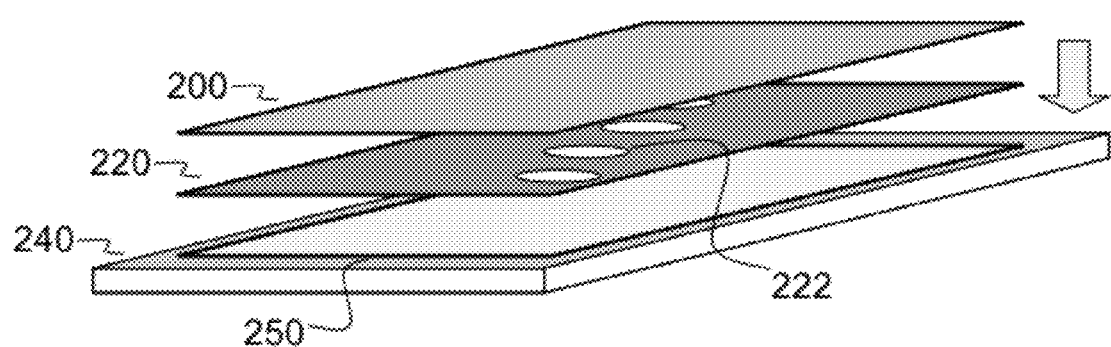
FIG. 2A is a perspective view of a sheet product, profiling template, and vacuum bed in accordance with an embodiment of the present invention.

FIG. 2A illustrates an exemplary system for the manufacture of sheet products having a varying surface profile in accordance with one embodiment of the disclosed invention. While the profiling template 220 illustrated in FIG. 2A, which is made of thin steel, has been laser cut to remove circular portions 222 of the profiling template 220, the disclosed invention envisions that the portions 222 could be of any shape or size such as, for example, circles with 50 mm diameters.

Figure 2B:
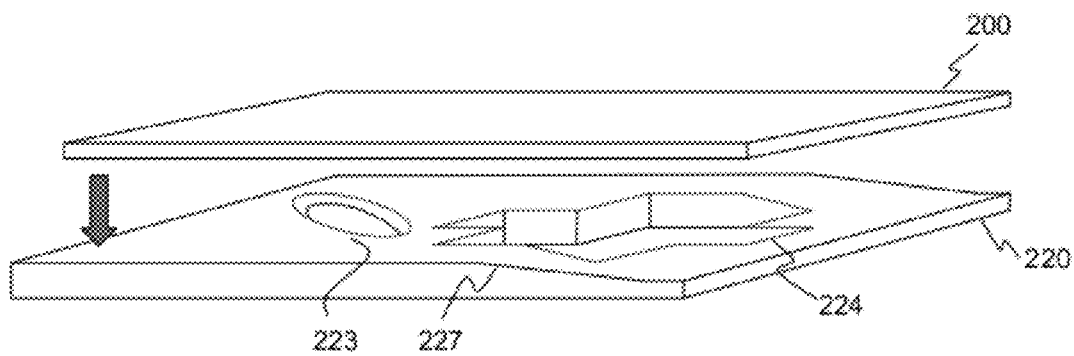
FIG. 2B is a perspective view of a profiling template and sheet product, where the profiling template has been machined to create a gradient and to remove portions thereof in accordance with an embodiment of the present invention.

FIG. 2B illustrates an exemplary profiling template 220 for the manufacture of sheet product 200 of varying surface profile in accordance with the disclosed invention. The profiling template 220 has been ground or machined to create a gradient or taper 227 and laser cut or machined to remove an oval portion 223 and a polygonal portion 224. Although the portions illustrated in profiling template 220 in FIGS. 2A-B are shown as circular 222, oval 223, and polygonal 224, it is to be understood that the portions can take on any desired shape depending upon the final surface profile desired.

Returning to FIG. 1 and FIGS. 2A-B, following the creation of the template in step 110, the profiling template 220 is placed on the support surface of the grinding machine in step 120, which acts as a datum surface. In an exemplary embodiment, the support surface can be a vacuum bed 240 and the profiling template 220 is placed inside an o-ring groove 250. In step 130, the sheet product 200 to be processed is then placed on top of the profiling template 220, extending outside the o-ring 250, and is conformed to the profiling template 220 in any suitable way. The disclosed invention envisions that the sheet product 200 could be of any length, width, and thickness. For example, a sheet product that measures 500 mm×1000 mm and has thickness between 0.5 mm and 2.0 mm may be used.

In an exemplary embodiment, in step 140 a vacuum can be applied at any point in this process by the vacuum bed 240. This can be accomplished by the utilization of any suitable means for applying a suction to the vacuum bed 240, e.g., by use of a vacuum pump. In the same or another embodiment, the support surface can be any suitable surface for permitting and enabling the sheet product to be pressed against the profiling template. Examples include the use of adhesive methods or by use of mechanical methods, e.g., by applying pneumatic pressure.

Figure 3A:
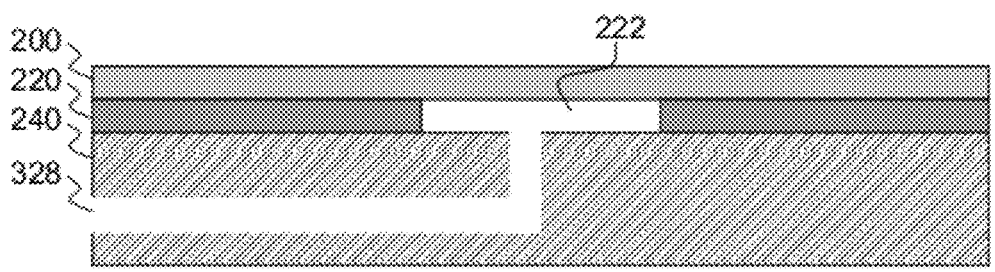
FIG. 3A is a cross-sectional side view of the sheet product, profiling template, and vacuum bed shown in FIG. 2A in accordance with an embodiment of the present invention.

FIG. 3A illustrates a cross-sectional view of an exemplary profiling template 220 placed between the sheet product 200 and vacuum bed 240. The vacuum bed 240 will require an evacuation channel 328 and can be of any suitable type, e.g., a custom made vacuum bed 240 with an o-ring groove 250 (not shown in FIGS. 3A-D).

Figure 3B:
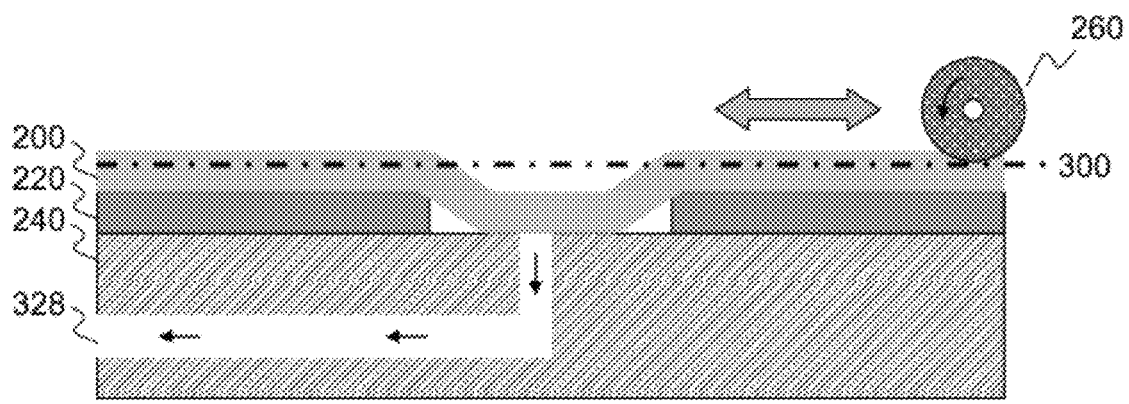
FIG. 3B is a side view of a state of the sheet product, profiling template, and vacuum bed shown in FIG. 2A, where a vacuum is applied to the sheet product and the vacuum bed is passed under a grinding head in accordance with an embodiment of the present invention.

FIG. 3B illustrates a cross-sectional side view of an exemplary sheet product 200, profiling template 220, and vacuum bed 240 while a vacuum is applied though evacuation channel 328. Where parts of the sheet product 200 can lay above cavities created by removed portions 222 of the template 220, the applied vacuum draws the sheet product 200 down into the cavities 222, and away from a grinding plane 300. Those portions of the sheet product 200 that lie above the grinding plane 300 can be removed by grinding head 260.

The grinding head 260 can be any suitable device for removing material from the sheet product 200, and will vary depending on the constitution of the sheet product 200. For example, if the sheet product 200 is a titanium or titanium alloy sheet, an appropriate grinding head can be either fixed or belt, with belts between 60 grit and 240 grit SiC or $Al_2O_3$ grinding media. In addition, the grinding head 260 can be a stationary head, or it can move along one or more axes, e.g., the vertical axis relative to the sheet product, or along rotational axes. Similarly, the vacuum bed 240 can also be stationary (in which case the grinding head 260 would move in at least one horizontal direction) or the vacuum bed 240 can have the capacity to move in one or more axes, including rotational axes.

Returning to FIG. 1 and FIGS. 3A-B, after the vacuum is applied, in step 150 the vacuum bed 240 is passed under the grinding head 260 to grind and/or polish the sheet product 200. The vacuum bed 240 can be passed under the grinding head 260 in step 152 in multiple directions, one or more times. After each pass, the vacuum bed 240 can be raised in step 154 to decrease the gap between the vacuum bed 240 and the grinding head 260. The vacuum bed 240 is repeatedly passed under the grinding head 260 in step 150 until the desired surface profile of the sheet product 200 is achieved.

Figure 3C:
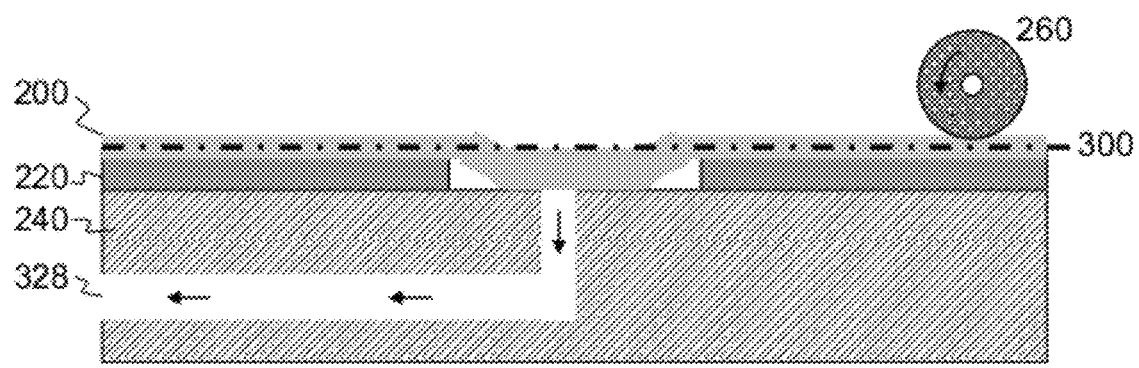
FIG. 3C is a side view of a state of the sheet product, profiling template, and vacuum bed shown in FIG. 2A, where a vacuum is applied to the sheet product and the vacuum bed has been passed under a grinding head to reduce overall thickness of the sheet product in accordance with an embodiment of the present invention.

FIG. 3C illustrates a cross-sectional side view of an exemplary sheet product 200, profiling template 220, and vacuum bed 240 after the vacuum bed 240 has been passed under the grinding head 260 along grinding plane 300 to reduce the overall surface profile (varying thicknesses across the surface on one or both sides) of sheet product 200.

Returning to FIG. 1, after the desired surface profile of the sheet product 200 is achieved, the vacuum can be released in step 160. By releasing the vacuum, the parts of sheet product 200 that were drawn into the cavities in the template can return to the grinding plane. The resulting sheet product has a new surface profile. The resulting sheet product 200 will also have given surface roughness depending on the type of grinding head 260 utilized and amount of processing performed.

Figure 3D:
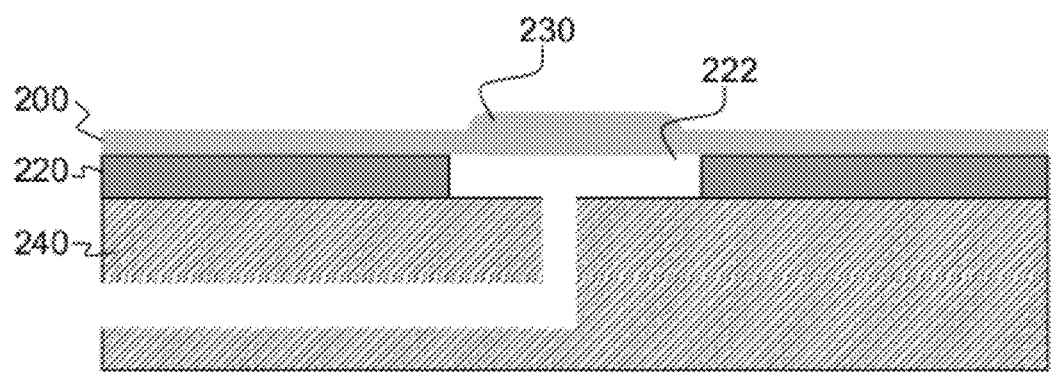
FIG. 3D is a side view of a state of the sheet product, profiling template, and vacuum bed shown in FIG. 2A, where the vacuum is released and the sheet product regains its original shape in accordance with an embodiment of the present invention.

FIG. 3D illustrates an exemplary sheet product 200, template 220, and vacuum bed 240 after the vacuum has been released. The resulting sheet product 200 has a new surface profile with reduced thickness overall, for example a thickness of 0.5 mm at the thinnest point, but can have the original, or another desired thickness, where the sheet product 200 was drawn down into the cavities created by removed portions 222 of the profiling template 220. This is indicated by the surface protrusion 230 shown in FIG. 3D. The sheet product 200 would have the original thickness, for example, where the portions of the sheet product 200 were drawn down into the cavities 222 at a depth below the grinding plane 300.

Figure 8A:
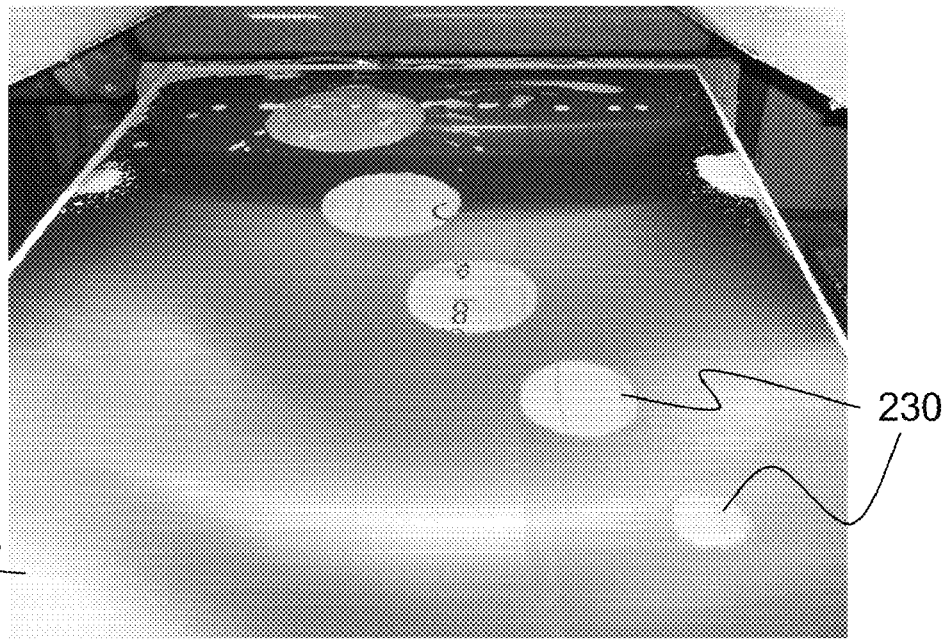
FIG. 8A is a photograph of a resulting sheet product in accordance with an exemplary embodiment of the present invention.
Figure 8B:
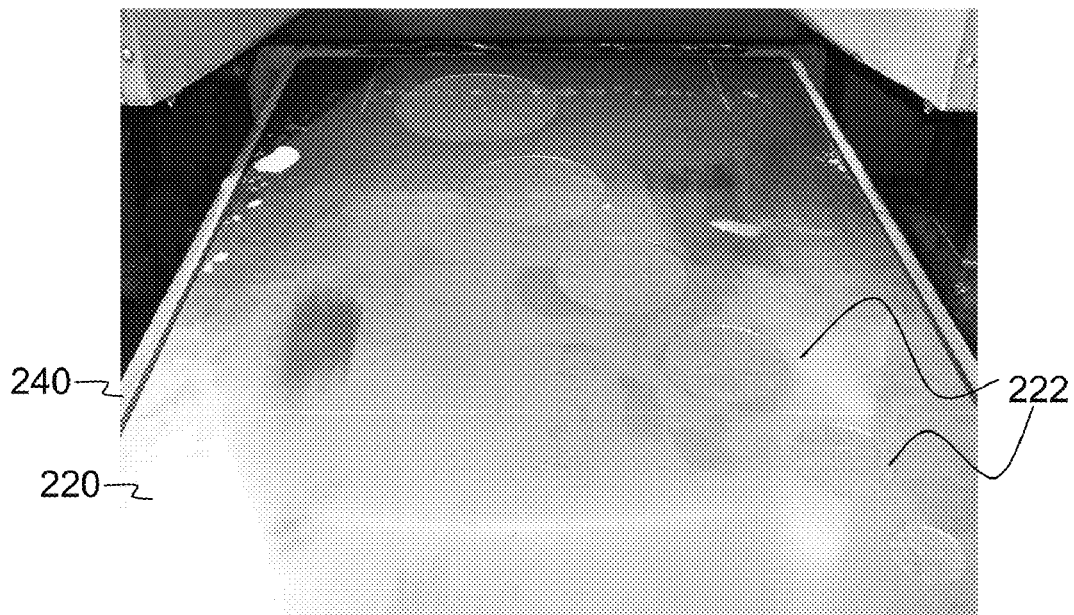
FIG. 8B is a photograph of a profiling template in accordance with an exemplary embodiment of the present invention.

FIG. 8A is a photo of an exemplary sheet product 200 profiled using the method shown in FIG. 1, wherein the sheet product 200 has been drawn down into the cavities created by removed portions 222, and is part way through the grinding process. A number of circular-shaped surface indentations 230 are visible in FIG. 8A and it can be seen that these surface indentations 230 have retained the original surface finish. FIG. 8B is a photo of the exemplary profiling template 220, used to create the sheet product shown in FIG. 8A. As shown in FIG. 8B, profiling template 220 is made of 0.5 mm sheet steel, and has been laser cut to remove circular portions 222 of approximately 25 mm to 200 mm diameter. The vacuum bed 240 shown in FIG. 8B is an aluminum custom-made bed approximately 1.5 m×1 m. FIG. 8B is also illustrated in FIG. 2A as template 220.

Figure 9:
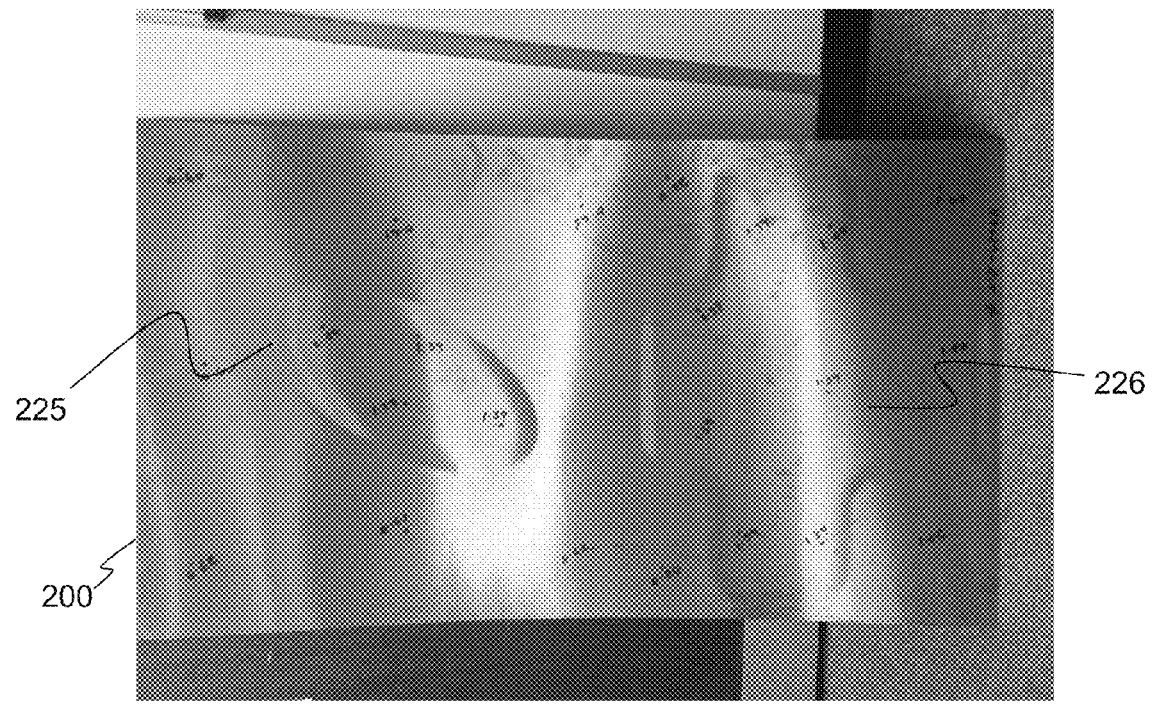
FIG. 9 is a photograph of a resulting sheet product in accordance with another exemplary embodiment of the present invention.

FIG. 9 is a photo of an exemplary sheet product of Ti 6-4 alloy measuring 685 mm×1195 mm, which has been profiled using the method shown in FIG. 1. The sheet product shown in FIG. 9 has been drawn down into the cavities created by oval portion 223 and polygonal portion 224, thereby producing the oval protrusion 225, and polygonal protrusion 226, respectively, as shown in FIG. 9. The profiled sheet product has also been ground to create a gradient or taper (not visible). The profiling template used to create the exemplary sheet product shown in FIG. 9 is illustrated as profiling template 220 in FIG. 2B. As illustrated by the surface markings provided on the sheet product 200 in FIG. 9, the resulting surface profile of the sheet product 200 varies in thickness from 0.60 to 1.40 mm.

Figure 4:
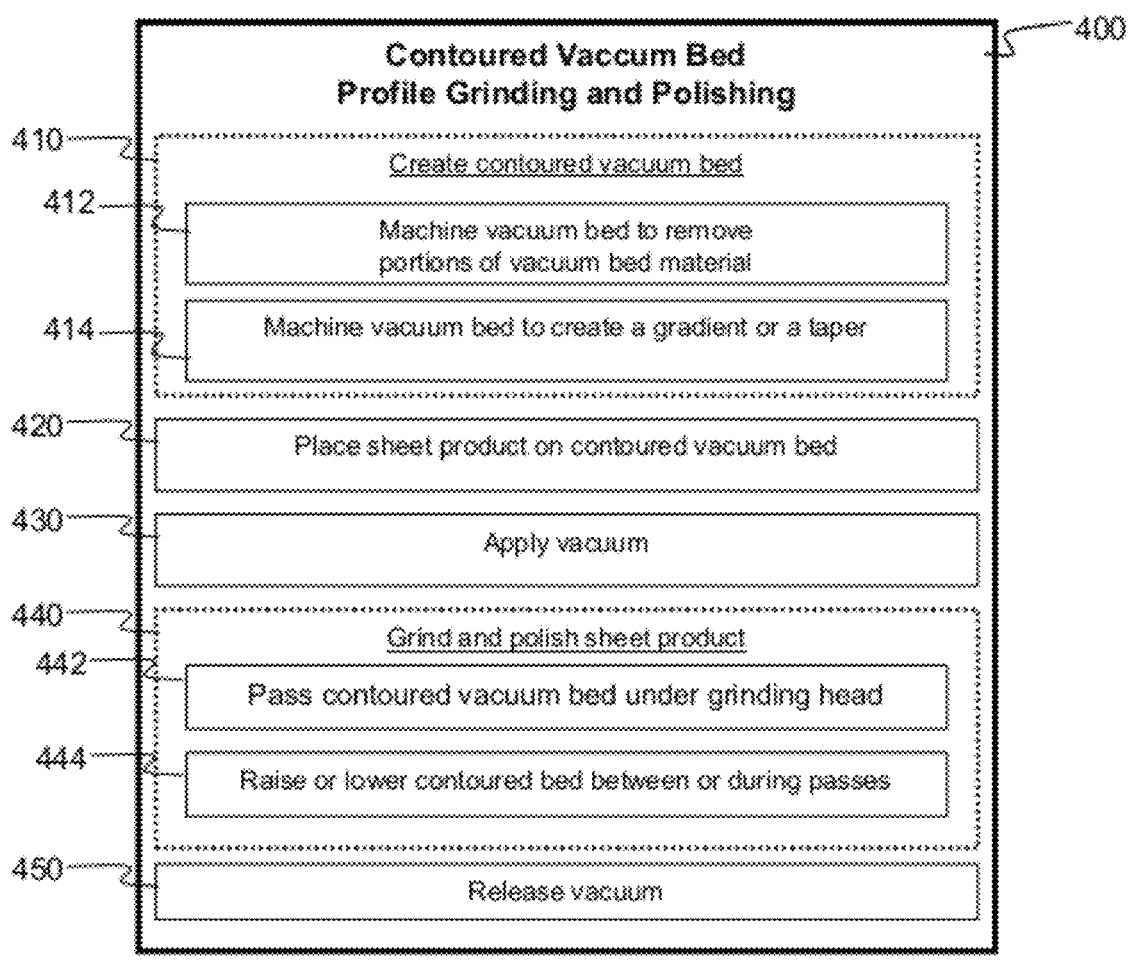
FIG. 4 is a flowchart illustrating a method in accordance with an exemplary embodiment of the present invention.

FIG. 4 illustrates an exemplary method 400 for the manufacture of sheet product 200 of varying surface profile in accordance with the disclosed invention. As shown in FIG. 4, the process begins at step 410 with the creation of the contoured support surface of the grinding machine, which acts as a datum surface. The contoured support surface can be formed of any suitable material, for example aluminum. In an exemplary embodiment, the contoured support surface can be a contoured vacuum bed. In the same or another embodiment, the support surface can by any surface suitable to permit and enable the sheet product to be conformed thereto.

As shown in FIG. 4, an exemplary contoured vacuum bed may be formed by machining the material of a vacuum bed in step 410. In one embodiment, the contoured vacuum bed may be machined in step 412 to remove any number of portions of the vacuum bed in any size, shape, or angle, and depth. In one exemplary embodiment, the vacuum bed may be machined to remove portions up to 0.5 mm deep. In the same or another embodiment, the contoured vacuum bed may be machined as in step 414 to create high spots on the contoured vacuum bed in any size, shape, angle, or height.

Figure 5:
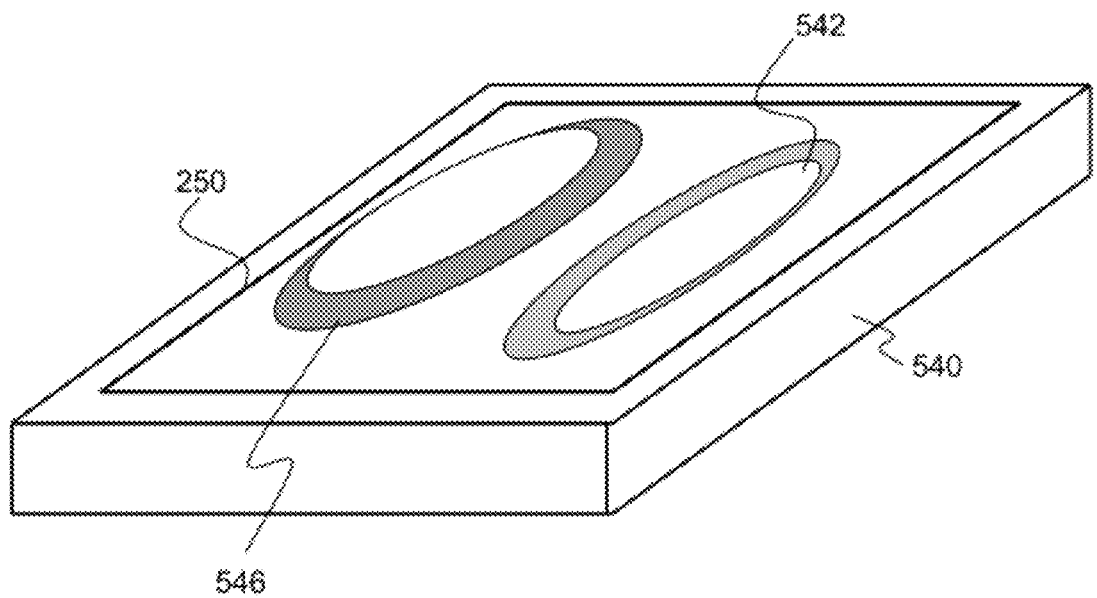
FIG. 5 is a perspective view of a contoured vacuum bed in accordance with an exemplary embodiment of the present invention.

FIG. 5 illustrates an exemplary contoured vacuum bed 540, which can be machined to remove cavities 542 of any shape such as, for example, a circular shape from the contoured vacuum bed 540. In the same or another embodiment, the exemplary contoured vacuum bed 540 can be machined to create high spots 546 in the contoured vacuum bed 540.

Returning to FIG. 4, following the creation of the contoured vacuum bed 540, in step 420 the sheet product is placed onto the contoured vacuum bed 540 and is conformed to the contoured vacuum bed 540 in any suitable way. In an exemplary embodiment, in step 430 a vacuum can be applied at any point in this process by the contoured vacuum bed 540. This can be accomplished by the utilization of any suitable means for applying a suction to the contoured vacuum bed. In an exemplary embodiment, the contoured vacuum bed 540 can be machined with an o-ring groove 250. A plurality of evacuation channels (not shown) are provided across the surface of the contoured vacuum bed 540 to ensure conformance of the sheet product 200 to its surface. The number of evacuation channels required generally depends on the complexity of the surface profile provided on the contoured vacuum bed 540. In the same or another embodiment, the sheet product 200 can be conformed to the support surface by any other suitable means such as, for example, by use of adhesive methods or by use of mechanical methods, e.g., by applying pneumatic pressure.

Figure 6:
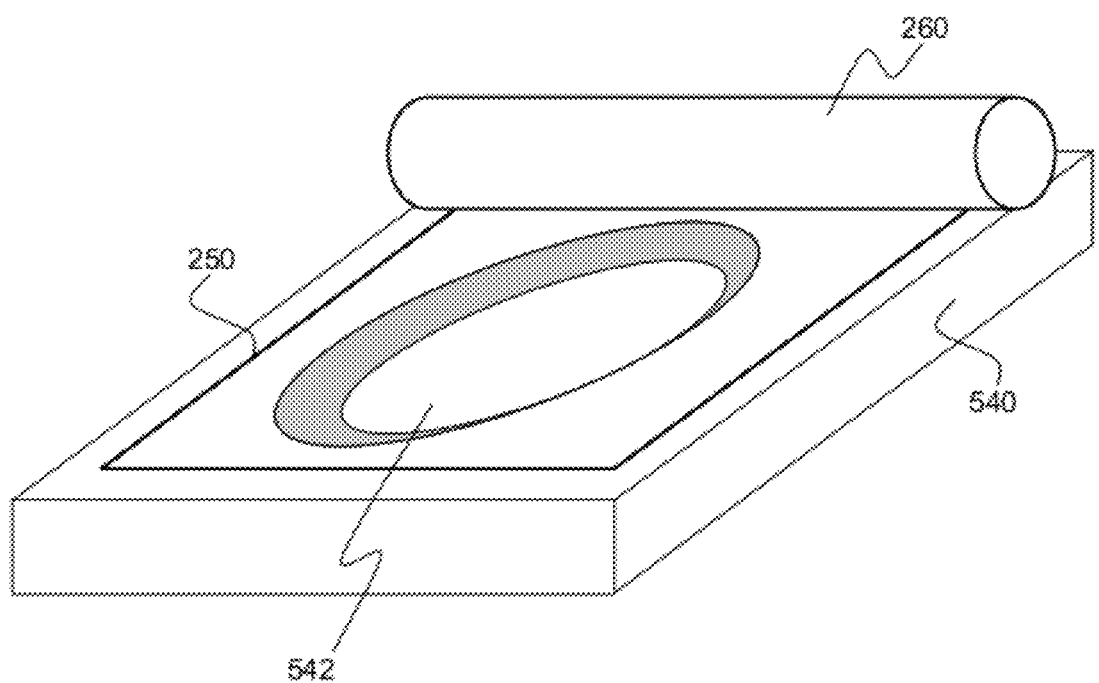
FIG. 6 is a perspective view of a grinding head and another contoured vacuum bed in accordance with an exemplary embodiment of the present invention.

FIG. 6 illustrates an exemplary grinding head 260 and contoured vacuum bed 540, which can be machined to remove cavities 542 of any shape, for example a circular shape. In one embodiment, the grinding head 260 may be a cylinder with a 300 mm diameter and length of 850 mm.

Figure 7:
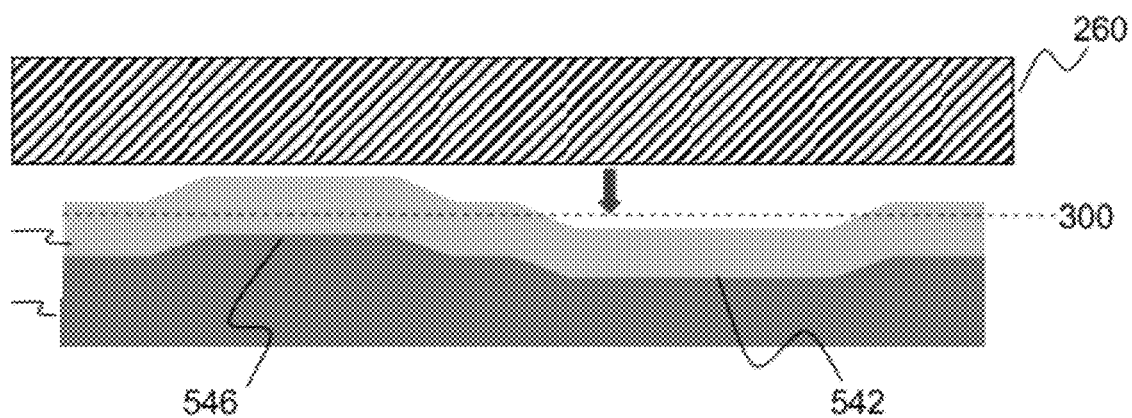
FIG. 7 is a cross-sectional side view of a grinding head, sheet product, and profiling vacuum bed in accordance with an exemplary embodiment of the present invention.

FIG. 7 illustrates a cross-sectional side view of an exemplary sheet product 200 that has been conformed into cavities 542 and over high spots 546 in the contoured vacuum bed 540.

Returning to FIG. 4, after the vacuum is applied in step 430, the contoured vacuum bed 540 is passed under the grinding head 260 to grind and/or polish the sheet product in step 440. In step 442, the contoured vacuum bed 540 can be passed under the grinding head 260 in multiple directions, one or more times. After each pass, in step 444 the contoured vacuum bed 540 can be raised to decrease the gap between the contoured vacuum bed 540 and the grinding head 260. The contoured vacuum bed may be passed under the grinding head 260 the desired number of times as in step 442 until the desired overall surface profile of the sheet product 200 is achieved.

The cross-sectional side view of the exemplary grinding head 260, sheet product 200, and contoured vacuum bed 540 shown in FIG. 7 also provides an illustrative grinding plane 300. After the vacuum bed has been passed under the grinding head 260 along grinding plane 300 the desired number of times, the overall surface profile (varying thickness across one or both sides) of sheet product 200 is reduced.

Returning to FIG. 4, after the desired surface profile of the sheet product 200 is achieved, the vacuum is released in step 450. The resulting sheet product has a new surface profile. The resulting sheet product 200 will have given surface roughness depending on the utilized grinding head.

Figure 10:
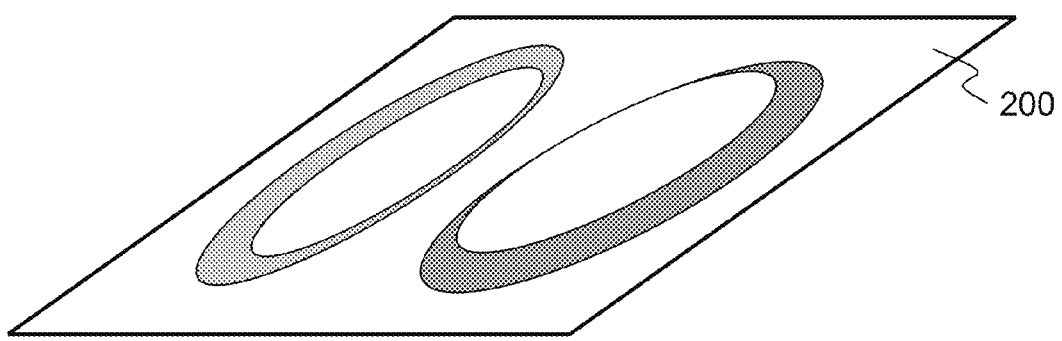
FIG. 10 is a perspective view of a resulting sheet product formed in accordance with an exemplary embodiment of the present invention.

FIG. 10 is a perspective view of a resulting sheet product 200 profiled using the method shown in FIG. 4 and the contoured vacuum bed 540 provided in FIG. 5. The presence of a high spot 546 creates a surface cavity on the profiled sheet product (shown at left in FIG. 10) whereas a cavity 542 creates a surface protrusion on the resulting sheet product (at right in FIG. 10).

It will be appreciated by persons skilled in the art that the present invention is not limited to what has been particularly shown and described in this specification. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. patent application Publications cited throughout this specification are incorporated by reference as if fully set forth in this specification.

What is claimed is:

1. A system for profiling a surface of a metal sheet product having a thickness between 0.5 mm and 2.0 mm comprising:
    (a) a profiling template made of sheet steel that has been cut to remove portions of the sheet steel for creating a surface profile on said metal sheet product;
    (b) a vacuum bed support surface which is coupled to said profiling template and is configured to hold said metal sheet product and said profiling template during processing; and
    (c) a grinding head comprising SiC or $Al_2O_3$ grinding media which is coupled to said support surface and is positioned to process a first surface of said metal sheet product.

2. The system of claim 1, wherein the sheet steel of the profiling template has been cut using a laser.

3. The system of claim 1, wherein said grinding head is movable in one or more directions.

4. The system of claim 1, wherein said support surface is movable in one or more directions.

5. The system of claim 1, wherein said metal sheet product is made of a Ti 6-4 metal alloy.

6. A system for profiling a surface of a metal sheet product having a thickness between 0.5 mm and 2.0 mm comprising:
    (a) a contoured vacuum bed support surface for determining a resulting profile of said metal sheet product and holding said metal sheet product during processing; and
    (b) a grinding head comprising SiC or $Al_2O_3$, coupled to said contoured vacuum bed support surface and positioned to process a first surface of said metal sheet product.

7. The system of claim 6, wherein said contoured vacuum bed support surface has been machined to remove portions of the vacuum bed.

8. The system of claim 6, wherein said grinding head is movable in one or more directions.

9. The system of claim 6, wherein said contoured vacuum bed support surface is movable in one or more directions.

10. The system of claim 6, wherein said metal sheet product is made of a Ti 6-4 metal alloy.

* * * * *